United States Patent
Kobayashi (10) Patent No.: US 7,607,292 B2
(45) Date of Patent: Oct. 27, 2009

(54) FUEL ADDITION APPARATUS

(75) Inventor: Masaaki Kobayashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 115 days.

(21) Appl. No.: 11/794,912

(22) PCT Filed: Sep. 7, 2006

(86) PCT No.: PCT/JP2006/017768

§ 371 (c)(1),
(2), (4) Date: Jul. 9, 2007

(87) PCT Pub. No.: WO2007/029784

PCT Pub. Date: Mar. 15, 2007

(65) Prior Publication Data

US 2008/0022656 A1      Jan. 31, 2008

(30) Foreign Application Priority Data

Sep. 9, 2005    (JP) .............................. 2005-261895

(51) Int. Cl.
*F01N 3/00*    (2006.01)

(52) U.S. Cl. .............................. 60/286; 60/280; 60/295; 60/301; 60/303

(58) Field of Classification Search .................... 60/274, 60/278, 280, 286, 295, 301, 303
See application file for complete search history.

(56) References Cited

U.S. PATENT DOCUMENTS 5,404,719 A * 4/1995 Araki et al. .................... 60/276
5,522,218 A * 6/1996 Lane et al. .................... 60/274
6,363,713 B1 * 4/2002 Wu et al. ....................... 60/274
6,817,174 B1 * 11/2004 Igarashi et al. ................ 60/295
7,017,337 B2 * 3/2006 Plote et al. .................... 60/295
7,441,402 B2 * 10/2008 Suzuki et al. ................. 60/286

FOREIGN PATENT DOCUMENTS

| JP | 2001-507103 A | 5/2001 |
| JP | 2002-038928 | 2/2002 |
| JP | 2002-161733 A | 6/2002 |
| JP | 2002-242663 | 8/2002 |
| JP | 2003-201836 A | 7/2003 |
| JP | 2003-222019 | 8/2003 |
| JP | 2003-328744 A | 11/2003 |
| JP | 2005-090274 | 4/2005 |
| JP | 2005-106047 A | 4/2005 |
| WO | WO 99/22128 | 5/1999 |

* cited by examiner

*Primary Examiner*—Binh Q Tran
(74) *Attorney, Agent, or Firm*—Kenyon & Kenyon LLP

(57) ABSTRACT

In a transient state, where the temperature at the distal end of a fuel adding valve enters a high temperature region, an addition amount for preventing clogging is not simply added in accordance with a map, but instead, delay in the rise of the temperature of the fuel adding valve in the transient state is taken into consideration, and the addition amount for preventing clogging is calculated on the basis of the elapsed time after the point in time when the temperature at the distal end of the fuel adding valve enters the distal end high temperature region and the drive state of the engine (for example, the number of rotations of the engine), and thus, addition is carried out (steps ST4 to ST6). Such addition control makes it possible to add an appropriate fuel addition amount for the rise in temperature of the fuel adding valve in the transient state, and thus, wasteful fuel addition is reduced.

6 Claims, 8 Drawing Sheets

FUEL ADDITION APPARATUS

This is a 371 national phase application of PCT/JP2006/317768 filed 7 Sep. 2006, claiming priority to Japanese Patent Application No. 2005-261895 filed 9 Sep. 2005, the contents of which are incorporated herein by reference.

FIELD OF THE INVENTION

The present invention relates to a fuel addition apparatus having a fuel adding valve for adding fuel into an exhaust passage of an internal combustion engine mounted in, for example, an automobile.

BACKGROUND OF THE INVENTION

In general internal combustion engines, such as diesel engines, where lean burn takes place in which an air-fuel mixture having a high air-fuel ratio (lean atmosphere) is burned occupies a large portion of the entirety of the drive region. Therefore, a NOx storage agent (NOx storage catalyst) for storing (absorbing) nitrogen oxide (hereinafter referred to as NOx) included in the exhaust is placed in the exhaust passage in engines of this type, so that the exhaust is purified.

In such NOx storage catalysts, it is necessary to regenerate the NOx storage catalyst by reducing NOx in the case where the degree of NOx storage reaches a state of saturation. The methods for reducing NOx include a method for adding a NOx reducing agent (fuel, for example, light oil) upstream from the NOx storage catalyst in the exhaust passage. In this case, the fuel thermally decomposes and hydrocarbon is generated, and a process for accelerating the reduction of NOx using this hydrocarbon as a reducing agent (NOx reducing process) is carried out.

The exhaust of diesel engines includes, for example, particulate matter (hereinafter referred to as PM) of which the main component is, for example, carbon, soot, and SOF (soluble organic fraction). These components cause air pollution. In order to purify such PM, a particulate filter is placed in the exhaust passage of diesel engines. In addition, exhaust purifying apparatuses where PM included in the exhaust which passes through the exhaust passage is collected by the particulate filter, and therefore, the amount of emission released into the air is reduced, are known. As the particulate filter, diesel particulate filters (DPFs) and diesel particulate-NOx reduction system (DPNR) catalysts, for example, are used.

In the case where PM is collected using such a particulate filter, pressure loss increases in exhaust which passes through the particulate filter when the amount of deposition of the collected PM becomes great, and the particulate filter becomes clogged. As a result, exhaust back pressure increases in the engine, and thus, the output of the engine and fuel efficiency are reduced. As the method for solving this, a process for accelerating oxidation (combustion) of PM on the particulate filter (PM eliminating process) is carried out by raising the temperature of the exhaust though addition of fuel into the exhaust passage (upstream from the particulate filter).

As described above, in NOx reducing processes and PM eliminating processes, which are carried out in order to prevent reduction of the working effects of the catalyst of purifying exhaust, a fuel adding valve is placed in the exhaust passage, so that fuel (reducing agent) is supplied into the exhaust passage. However, the nozzle hole of the fuel adding valve is exposed to the interior of the exhaust passage. Therefore, such substances as soot and SOF included in the exhaust gas deposit and adhere to the nozzle hole of the fuel adding valve. The deposited and adhering substances are exposed to the exhaust at a high temperature and thus caulks. As a result, the nozzle hole of the fuel adding valve becomes clogged. As a method for preventing such clogging of the fuel adding valve, there is a method for lowering the temperature at the distal end of the fuel adding valve by forcibly adding fuel (hereinafter referred to as "addition for preventing clogging") with a different timing from the addition of fuel at the time of NOx reduction and PM elimination (see, for example, Patent Document 1).

In a map used for addition for preventing clogging, the amount for addition and the intervals for addition are adjusted when the engine is in a normal state, and the temperature at the distal end of the fuel adding valve is stable. Therefore, as shown in, for example, FIG. 9, the following problem arises in a transient state, where the temperature at the distal end of the fuel adding valve enters the distal end high temperature region A (ON region) (OFF→ON).

Figure 9:
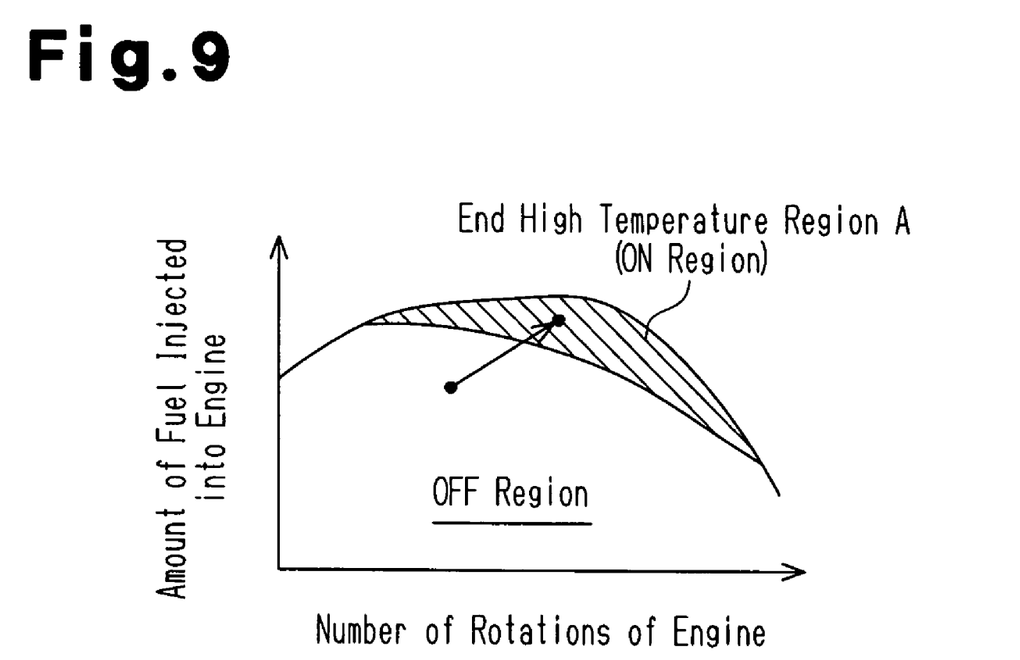
FIG. 9 is a diagram showing a map of estimated temperature at the distal end of the fuel adding valve.
Figure 10:
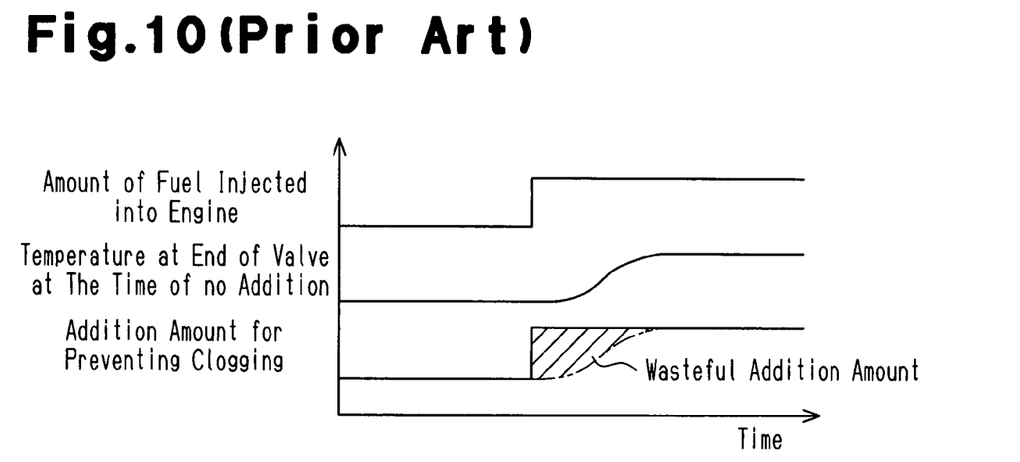
FIG. 10 is a diagram showing a problem with the control of addition for preventing clogging according to the prior art.

That is to say, in conventional control of addition for preventing clogging, the amount of addition corresponding to a map (amount of addition for preventing clogging) is simply added before the temperature at the distal end of the fuel adding valve becomes high in the transient state, where the temperature at the distal end of the fuel adding valve enters the distal end high temperature region A. Therefore, fuel efficiency deteriorates as a result of wasteful addition of fuel. This is described concretely as follows. In the transient state, where the temperature at the distal end of the fuel adding valve enters the distal end high temperature region A, as shown in FIG. 10, the temperature at the distal end of the fuel adding valve (the temperature at the distal end of the valve without fuel added) does not increase immediately, but increases after a certain period of time has elapsed. Therefore, in a case where the amount of addition for preventing clogging which corresponds to a map is added at the point in time when the temperature at the distal end of the fuel adding valve enters the distal end high temperature region A (OFF→ON) as carried out in the conventional control, the amount for addition increases before the temperature at the distal end actually rises, and fuel of an amount corresponding to the hatched portion in FIG. 10 is wasted.

Patent Document 1: Japanese Laid-Open Patent Publication 2003-222019

SUMMARY OF THE INVENTION

An object of the present invention is to provide a fuel addition apparatus which allows for prevention of wasteful addition of fuel when addition for preventing clogging of the fuel adding valve is carried out.

According to one aspect of the present invention, a fuel addition apparatus having a fuel adding valve for adding fuel into the exhaust passage of an internal combustion engine is provided. This fuel addition apparatus is provided with an addition amount calculating section and an addition controlling section. The addition amount calculating section calculates the amount for addition of fuel on the basis of the elapsed time after the point in time when the temperature of the fuel adding valve enters a particular region that has been set in advance, and the drive state of the internal combustion engine. The addition controlling section controls fuel addition on the basis of the calculated amount for addition of fuel and the above described elapsed time. In the present aspect, the particular region is also referred to as a high temperature region, and is a region where the temperature at the distal end of the fuel adding valve reaches a high temperature (temperature at which substances that have deposited and attached to the distal end of the adding valve easily caulk).

Preferably, the addition amount calculating section calculates the amount of fuel addition by multiplying a basic fuel addition amount, which is calculated from a map that has been set in advance, by a correction coefficient corresponding to the above described elapsed time and the drive state of the above described internal combustion engine. In this case, preferably the addition amount calculating section corrects the amount of addition by multiplying one of basic addition intervals or basic addition period, which is calculated from a map that has been set in advance, by a correction coefficient. Preferably, as the drive state of the above described combustion engine, the number of rotations of the engine, the temperature of the exhaust, or the intake air amount (amount of exhaust) is used for the calculation of the amount of fuel addition.

In this configuration, when the temperature of the fuel adding valve enters the high temperature region, addition for preventing clogging is carried out and the temperature at the distal end of the fuel adding valve is lowered, in order to prevent the nozzle hole of the fuel adding valve from becoming clogged as a result of calking. At the time of addition for preventing clogging, the amount of addition corresponding to a map is not simply added, and the amount of fuel addition is determined on the basis of the elapsed time after the point in time when the temperature of the fuel adding valve enters the high temperature region and the drive state of the internal combustion engine (for example, the number of rotations of the engine), taking the delay in increase in the temperature of the fuel adding valve in the transient state, where the temperature of the fuel adding valve enters the high temperature region, into consideration. Therefore, it becomes possible to add an appropriate amount of fuel addition for increasing of the temperature of the fuel adding valve in the transient state, and thus, the wasteful amount of addition is reduced.

According to another aspect of the present invention, a fuel addition apparatus having a fuel adding valve for adding fuel into the exhaust passage of an internal combustion engine is provided. This fuel addition apparatus has an addition controlling section which starts the control of addition after a predetermined period of time has elapsed after the point in time when the temperature of the fuel adding valve enters a particular region that has been set in advance.

In this configuration, the point where the temperature of the fuel adding valve does not immediately increase in the transient state where the temperature of the fuel adding valve enters the high temperature region is taken into consideration, and control of addition starts with a delay of a predetermined period of time (for example, time before the temperature of the fuel adding valve rises to a high temperature) after the point in time when the temperature of the fuel adding valve enters the high temperature region. Therefore, the wasteful amount of fuel addition is reduced. In addition, waste of added fuel is reduced through simple control.

Preferably, the delay time before the control of addition is started after the point in time when the temperature of the fuel adding valve enters a particular region that has been set in advance is set in accordance with the temperature of the fuel adding valve. In this configuration, addition of fuel is started as the temperature of the fuel adding valve increases in the transient state, and thus, it becomes possible to further reduce the wasteful amount of fuel addition. In this case, the greater the difference in the temperature is when the fuel adding valve transitions from the OFF region to the ON region in the transient state, where the fuel adding valve enters the high temperature region, the longer the delay time may be set.

DETAILED DESCRIPTION

In the following, embodiments of the present invention are described in reference to the drawings.

Figure 1:
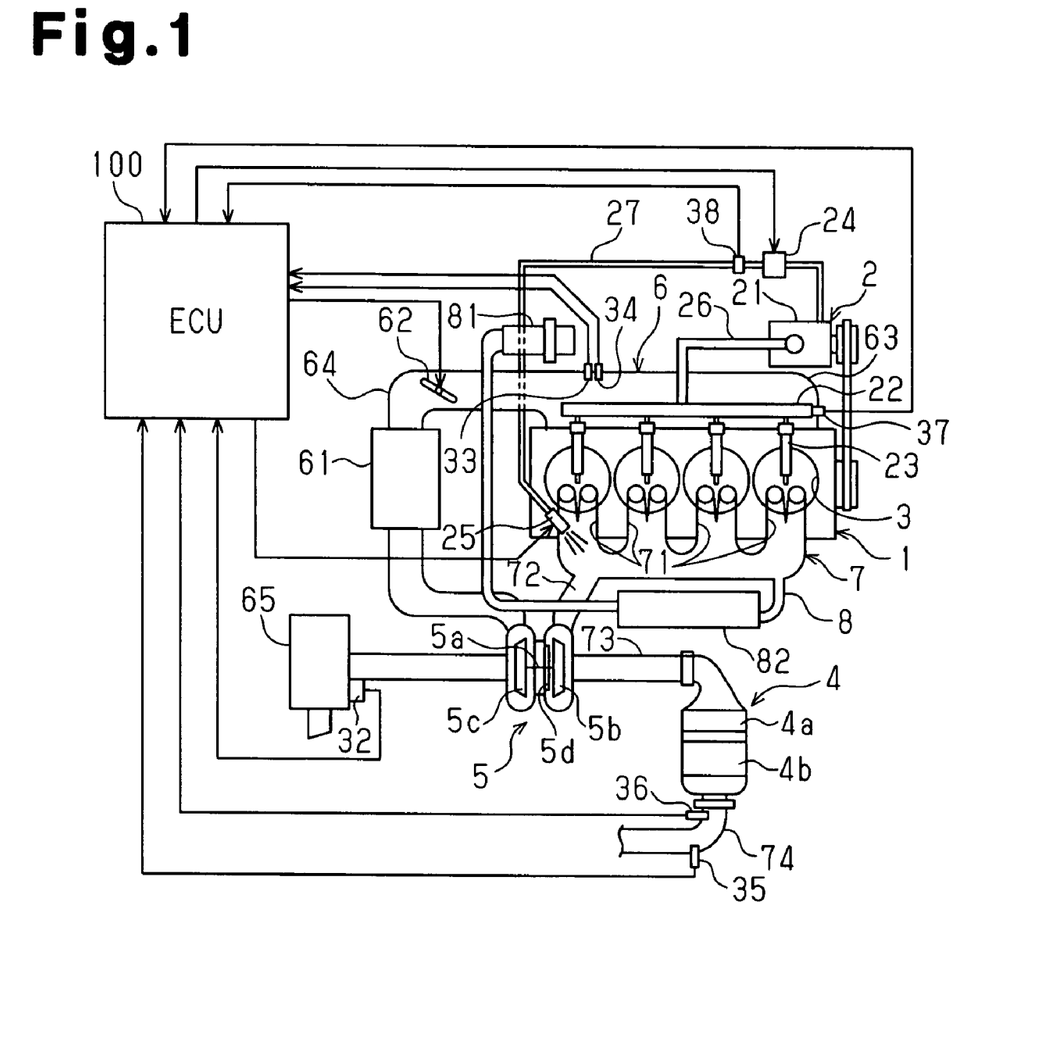
FIG. 1 is a configuration diagram schematically showing an example of a diesel engine to which the present invention is applied.

The configuration of a diesel engine to which a fuel addition apparatus according to the present invention is applied is schematically described in reference to FIG. 1. A diesel engine 1 (hereinafter simply referred to as an "engine 1") is, for example, a common rail type four cylinder engine with direct injection into the cylinders. The engine 1 is mainly formed of, for example, a fuel supplying system 2, combustion chambers 3, an intake system 6, and an exhaust system 7.

The fuel supplying system 2 is provided with a supply pump 21, a common rail 22, injectors (fuel injection valves) 23, a blocking valve 24, a fuel adding valve 25, an engine fuel passage 26, and a fuel addition passage 27.

The supply pump 21 pumps up fuel from the fuel tank, and high pressure is applied to the fuel that has been pumped up, and after that, the fuel is supplied to the common rail 22 through the engine fuel passage 26. The common rail 22 functions as a pressure accumulator for keeping the high pressure fuel that is supplied from the supply pump 21 at a predetermined pressure (accumulating pressure), and distributes the fuel to which pressure is applied to the respective injectors 23. The injectors 23 are electromagnetic drive type on-off valves which open when a predetermined voltage is applied, and inject and supply fuel into the combustion chambers 3.

The supply pump 21 supplies a portion of the fuel that is pumped up from the fuel tank to the fuel adding valve 25 through the fuel addition passage 27. The fuel adding valve 25 is an electromagnetic drive type on-off valve which opens when a predetermined voltage is applied and adds fuel into the exhaust system 7 (exhaust manifold 72 from exhaust ports 71). The blocking valve 24 blocks the fuel addition passage 27 and stops the supply of fuel in times of emergency.

The fuel addition apparatus is provided with the above described fuel adding valve 25, the fuel addition passage 27, the blocking valve 24 and an ECU (electronic control unit) 100 for controlling opening and closing of the fuel adding valve 25.

The intake system 6 is provided with an intake manifold 63 which is connected to intake ports formed in a cylinder head. An intake pipe 64 which forms an intake passage is connected to this intake manifold 63. An air cleaner 65, an airflow meter 32, and a throttle valve 62 are provided in the intake passage in this order from the upstream side. The airflow meter 32 outputs an electrical signal in accordance with the amount of air that flows into the intake passage through the air cleaner 65.

The exhaust system 7 is provided with an exhaust manifold 72 which is connected to exhaust ports 71 formed in the cylinder head. Exhaust pipes 73 and 74 which form the exhaust passage are connected to this exhaust manifold 72. A catalyst device 4 is provided in the exhaust passage.

The catalyst device 4 is provided with a NOx storage reduction catalyst 4a and a DPNR catalyst 4b. The NOx storage reduction catalyst 4a stores NOx in such a state that there is a large amount of oxygen in the exhaust. In addition, the NOx storage reduction catalyst 4a reduces NOx to $NO_2$ or NO, which is then released, in such a state that the concentration of oxygen in the exhaust is low and there are a large amount of components to be reduced (for example, an unburned component (HC) of fuel). NOx that has been released as $NO_2$ or NO reacts rapidly with HC and CO in the exhaust, and thereby, is further reduced to $N_2$. In addition, HC and CO reduce $NO_2$ and NO, and thus, are oxidized to $H_2O$ or $CO_2$.

In the DPNR catalyst 4b, a NOx storage reduction catalyst is carried in, for example, a porous ceramic structure. PM in the exhaust is collected when it passes through the porous walls. In the case where the air-fuel ratio in the exhaust is lean, NOx in the exhaust is stored by the NOx storage reduction catalyst. In addition, when the air-fuel ratio becomes rich, the stored NOx is reduced and released. Furthermore, the DPNR catalyst 4b carries a catalyst for oxidizing and burning collected PM (for example, an oxidation catalyst of which the main component is a precious metal, for example, platinum).

The engine 1 is provided with a turbocharger (supercharger) 5. This turbocharger 5 is provided with a turbine wheel 5b and a compressor wheel 5c, which are linked to each other via a turbine shaft 5a. The compressor wheel 5c is placed so as to face the inside of the intake pipe 64. The turbine wheel 5b is placed so as to face the inside of the exhaust pipe 73. This turbocharger 5 rotates the compressor wheel 5c using the exhaust flow (exhaust pressure) received by the turbine wheel 5b, and thus, supercharges the intake air. This turbocharger 5 is, for example, a variable nozzle type turbocharger. In the turbocharger 5, a variable nozzle vane mechanism 5d is provided on the turbine wheel 5b side. The opening degree of this variable nozzle vane mechanism 5d is adjusted, and thus, the supercharged pressure in the engine 1 is adjusted.

An intercooler 61 for forcibly cooling the intake air of which the temperature has risen through supercharging in the turbocharger 5 is provided in the intake pipe 64 of the intake system 6. A throttle valve 62 is provided further downstream from this intercooler 61. The throttle valve 62 is an electronic control type on-off valve which allows for continuous adjustment of the degree of opening. The throttle valve 62 has a function of reducing the area of the flow passage for the intake air under predetermined conditions and adjusting (reducing) the amount of intake air supplied.

The engine 1 is provided with an EGR passage (exhaust recirculation passage) 8 for connecting the intake system 6 to the exhaust system 7. The EGR passage 8 makes an appropriate portion of the exhaust recirculation to the intake system 6, and re-supplies the portion of the exhaust to the combustion chambers 3, and therefore, the temperature for combustion lowers. Thus, the EGR passage 8 reduces the amount of NOx generated. The EGR passage 8 is provided with an EGR valve 81 and an EGR cooler 82 for cooling exhaust which passes through (recirculates through) the EGR passage 8. The degree of opening of the EGR valve 81 is adjusted, and thus, the amount of EGR (amount of exhaust recirculation) which is introduced from the exhaust system 7 into the intake system 6 is adjusted.

Various types of sensors are attached in respective portions of the engine 1. These sensors output signals relating to the environmental conditions in respective portions of the engine 1 and the drive state of the engine 1.

The airflow meter 32, for example, outputs a detection signal corresponding to the amount of flow of intake air (amount of intake air) upstream from the throttle valve 62 within the intake system 6. An intake air temperature sensor 33 is placed in the intake manifold 63 and outputs a detection signal corresponding to the temperature of the intake air. An intake air pressure sensor 34 is placed in the intake manifold 63 and outputs a detection signal corresponding to the pressure of the intake air. The A/F (air-fuel ratio) sensor 35 outputs a detection signal which continuously changes in accordance with the concentration of oxygen in the exhaust downstream from the catalyst casing of the exhaust system 7. Likewise, an exhaust temperature sensor 36 outputs a detection signal corresponding to the temperature of the exhaust (exhaust temperature) downstream from the catalyst casing of the exhaust system 7. A rail pressure sensor 37 outputs a detection signal corresponding to the pressure of the fuel stored within the common rail 22. A fuel pressure sensor 38 outputs a detection signal corresponding to the pressure of the fuel (fuel pressure) which flows through the fuel addition passage 27.

Figure 2:
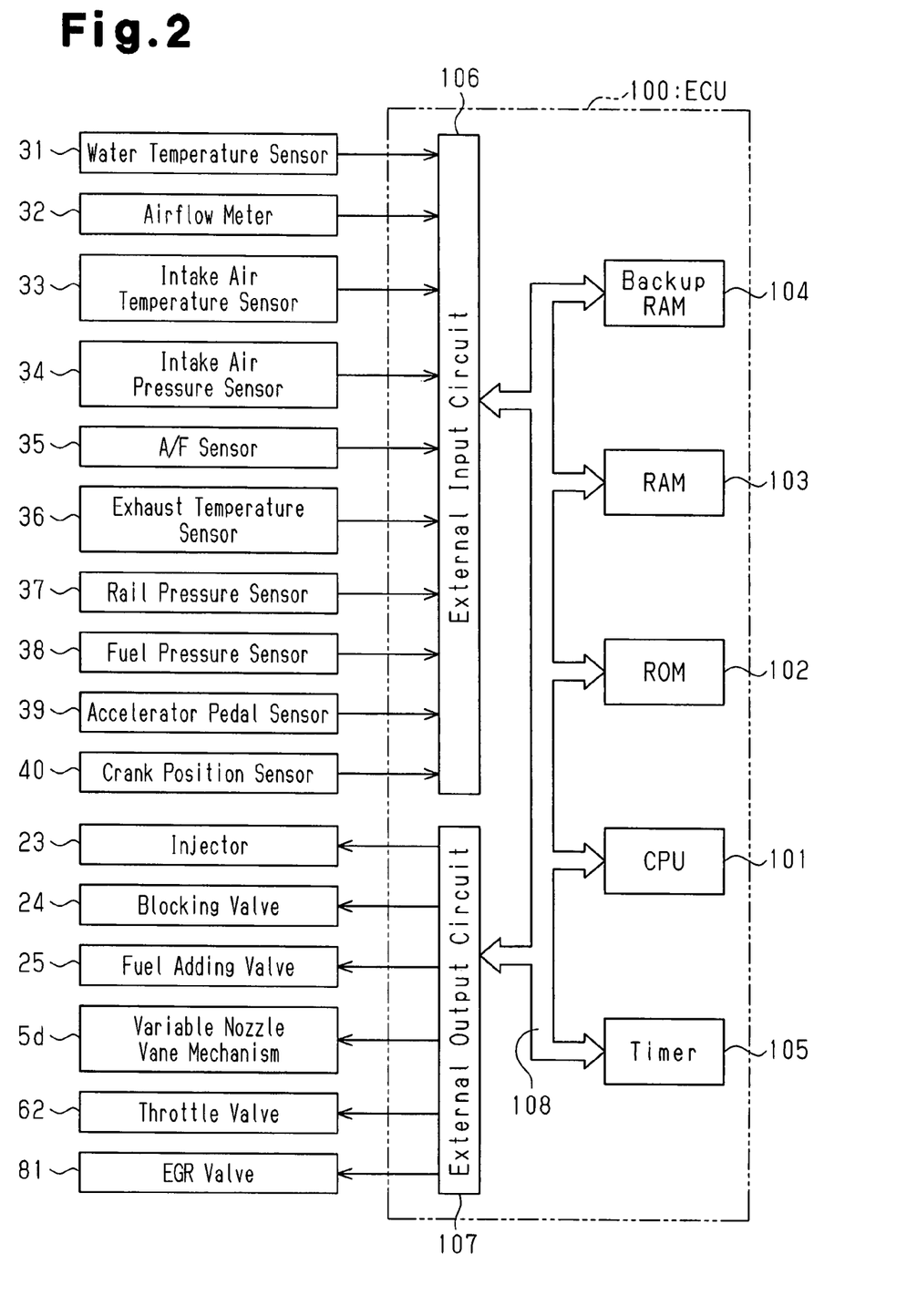
FIG. 2 is a block diagram showing the configuration of an ECU, which is a control system.

The ECU 100 is provided with a CPU 101, a ROM 102, a RAM 103, and a backup RAM 104, as shown in FIG. 2. The ROM 102 stores, for example, various types of control programs and maps which are referred to when these various types of control programs are run. The CPU 101 carries out various types of arithmetic processes on the basis of various types of control programs and the maps stored in the ROM 102. The RAM 103 is a memory for temporarily storing the results of operation in the CPU 101 and data that is inputted from the respective sensors, for example. The backup RAM 104 is a nonvolatile memory for storing data to be stored, for example, when the engine 1 is stopped.

The above described ROM 102, CPU 101, RAM 103 and backup RAM 104 are connected to each other via a bus 108, and at the same time, are connected to an external input circuit 106 and an external output circuit 107.

The above described airflow meter 32, intake air temperature sensor 33, intake air pressure sensor 34, A/F sensor 35, exhaust temperature sensor 36, rail pressure sensor 37, and fuel pressure sensor 38 are connected to the external input circuit 106. Furthermore, a water temperature sensor 31 which outputs a detection signal corresponding to the temperature of the water for cooling the engine 1, an accelerator pedal sensor 39 which outputs a detection signal corresponding to the degree to which the accelerator pedal is pressed, and a crank position sensor 40 which outputs a detection signal (pulse) whenever the output shaft (crankshaft) of the engine 1 rotates by a predetermined angle, for example, are connected to the external input circuit 106. Meanwhile, the injectors 23, the blocking valve 24, the fuel adding valve 25, the variable nozzle vane mechanism 5*d*, the throttle valve 62 and the EGR valve 81, for example, are connected to the external output circuit 107.

The ECU 100 carries out various types of control for the engine 1 on the basis of the output of the above described various sensors. Furthermore, the ECU 100 carries out PM elimination control and addition control for preventing clogging described below.

In the PM elimination control, first, the ECU 100 estimates the amount of PM which deposits on the DPNR catalyst 4*b*. Methods for estimating the amount of PM which deposits include a method for finding the amount of PM which deposits in advance on the basis of the drive state of the engine 1 (for example, the temperature of the exhaust, the amount of injected fuel and the number of rotations of the engine) through experiments or the like, forming a map and integrating the amount of PM which deposits and is found from this map so that the amount of PM which deposits is estimated. In addition, methods for estimating the amount of PM which deposits include a method for estimating the amount of PM which deposits on the basis of the distance over which the vehicle runs and the time during which the vehicle has run. Alternative methods for estimating the amount of PM which deposits include a method for providing a differential pressure sensor for detecting the difference in pressure upstream and downstream of the DPNR catalyst 4*b* in the catalyst device 4 and estimating the amount of PM which deposits and is collected on the DPNR catalyst 4*b* on the basis of the sensor output of this differential pressure sensor.

In addition, the ECU 100 determines the right timing for regenerating the DPNR catalyst 4*b*, and carries out PM elimination control when the estimated amount of PM becomes a predetermined reference value or higher (limited amount of deposition). Concretely, a map that is prepared in advance through experiments or the like is referred to and thus, the amount of fuel addition and the intervals for addition are calculated on the basis of the number of revolutions of the engine, which is read in from the output of the crank position sensor 40. In addition, opening and closing of the fuel adding valve 25 is controlled in accordance with the results of this calculation, and addition of fuel into the exhaust system 7 is repeated intermittently. As a result of addition of fuel, the temperature of the catalyst bed of the DPNR catalyst 4*b* rises, and thus, PM which deposits on the DPNR catalyst 4*b* is oxidized and converted to $H_2O$ or $CO_2$, which is then discharged.

The ECU 100 performs the PM elimination control as described above, and in addition, sometimes carries out the S release control, as well as NOx reduction control. In the S release control, addition of fuel through the fuel adding valve 25 is repeated intermittently so that the temperature of the catalyst bed rises to a high temperature, and the air-fuel ratio in the exhaust becomes stoichiometric or rich, and thus, sulfur components are released from the NOx storage reduction catalyst 4*a* and the NOx storage reduction catalyst within the DPNR catalyst 4*b*. In the NOx reduction control, fuel is added intermittently through the fuel adding valve 25 and NOx that has been stored by the NOx storage reduction catalyst 4*a* and the NOx storage reduction catalyst within the DPNR catalyst 4*b* is reduced to $N_2$, $CO_2$ and $H_2O$, which are then released.

The PM elimination control, S release control, and the NOx reduction control are carried out when there is a request for implementation of any of these, and in the case where implementation of control overlaps, priority is placed in the order: the PM elimination control→S release control→the NOx reduction control, when these must be implemented.

In the addition control for preventing clogging, first, as described above, fuel is supplied into the exhaust passage from the fuel adding valve 25 in the PM elimination control, S release control, and NOx reduction control, which are carried out in order to prevent the working effects of the catalyst of cleaning the exhaust from lowering. The nozzle hole of the fuel adding valve 25 is exposed to the interior of the exhaust passage, and therefore, such substances as soot and SOF included in the exhaust deposit and adhere to the nozzle hole of the fuel adding valve 25. In addition, substances which deposit and adhere are exposed to the exhaust at a high temperature, and thereby, calk. As a result, the nozzle hole of the fuel adding valve 25 becomes clogged. In order to solve this, addition for preventing clogging is carried out. However, in the conventional addition control for preventing clogging, the amount of addition corresponding to a map (addition amount for preventing clogging) is simply added, even in the transient state, where the temperature at the distal end of the fuel adding valve 25 enters the distal end high temperature region A (see FIG. 9). Therefore, there is a problem with the conventional addition control for preventing clogging, such that the amount of addition increases before the temperature at the distal end of the fuel adding valve 25 actually rises, and thus, an unnecessary amount of fuel is added. Therefore, according to the present embodiment, the delay in the rise of the temperature of the fuel adding valve in the transient state, where the temperature at the distal end of the fuel adding valve 25 enters the high temperature region, is taken into consideration, and thus, an appropriate amount of fuel addition is added for the increase in the temperature at the distal end of the fuel adding valve 25.

Figure 3:
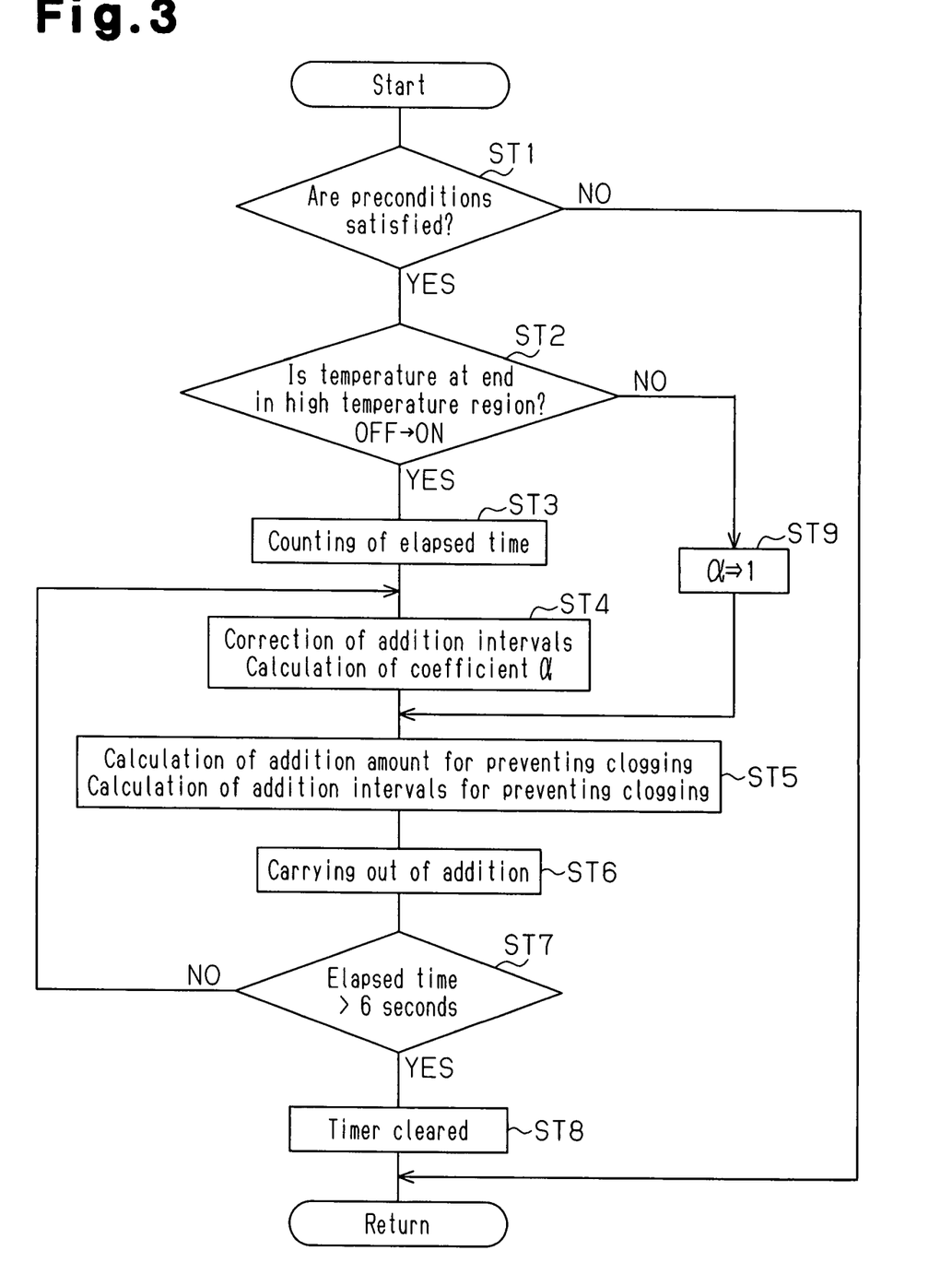
FIG. 3 is a flowchart showing an example of control of addition for preventing clogging as carried out by the ECU.

A concrete example of addition control for preventing clogging according to the present embodiment is described in reference to the flowchart of FIG. 3. This addition control for preventing clogging is carried out by the ECU 100. That is to say, the ECU 100 functions as an addition amount calculating section and an addition controlling section.

First, in step ST1, whether or not preconditions for carrying out addition for preventing clogging are satisfied is determined, and in the case where the result of this determination is affirmative, the process goes to step ST2. In the case where the result of the determination in step ST1 is negative, the routine of addition control for preventing clogging is terminated. The preconditions in step ST1 are, for example, an engine 1 which has started without failure and reached a drive state of idling.

In step ST2, whether or not the temperature at the distal end of the fuel adding valve 25 has entered the distal end high temperature region A (ON region) from the OFF region is determined with reference to a map for estimation as shown in FIG. 9, on the basis of the number of rotations of the engine and the amount of fuel injected into the engine 1, which have been read in from the output of the crank position sensor 40. In the case where the result of this determination is affirmative, that is to say, when the temperature at the distal end of the fuel adding valve 25 enters the distal end high temperature region A (OFF→ON), the process goes to step ST3. Then, the elapsed time after the point in time when the temperature at the distal end of the fuel adding valve 25 enters the distal end high temperature region A is counted by a timer 105. Meanwhile, in the case where the result of determination in step ST2 is negative, addition interval correction coefficient α is set to "1" in step ST9, and the process goes to step ST5.

Figure 4:
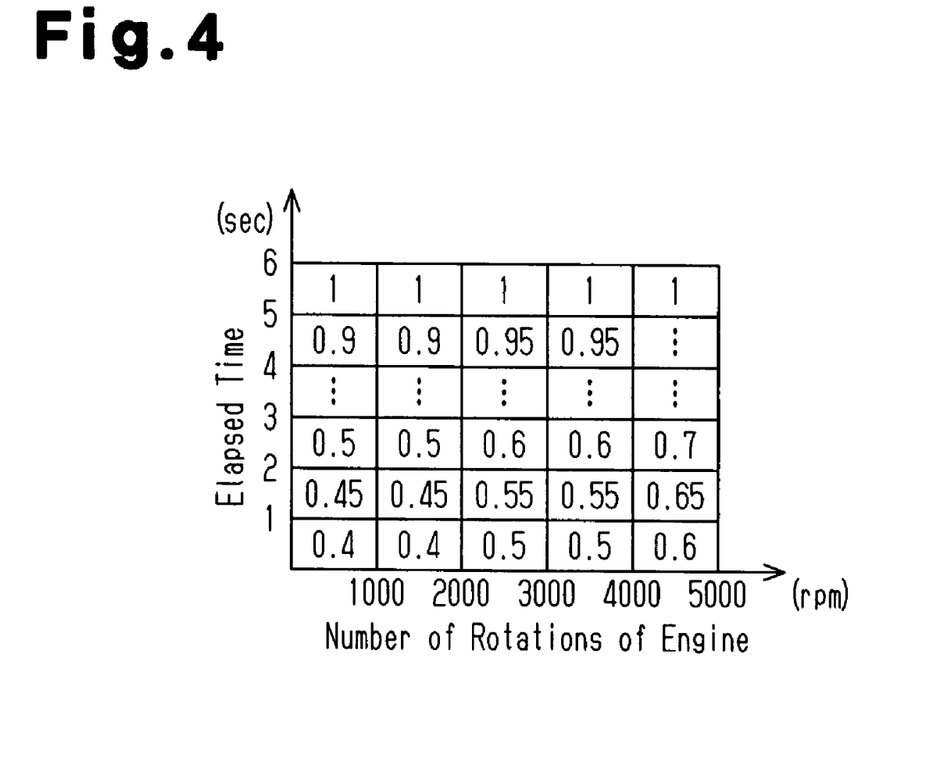
FIG. 4 is a diagram showing a map for calculating a correction coefficient which is used in the control of addition for preventing clogging shown in FIG. 3.

In step ST4, the addition interval correction coefficient α is calculated. Concretely, the number of rotations of the engine is read in from the output of the crank position sensor 40 for each second that elapses after the point in time when the temperature at the distal end of the fuel adding valve 25 enters the distal end high temperature region A on the basis of the elapsed time, which is counted by the timer 105. Then, the addition interval correction coefficient α is calculated in reference to a map for calculation of the correction coefficient shown in FIG. 4 on the basis of this number of rotations of the engine and the elapsed time (1 second, 2 seconds . . . 5 seconds).

Next, in step ST5, the addition amount for preventing clogging and the intervals of addition for preventing clogging T1 are calculated. The addition amount for preventing clogging is calculated in reference to a map for the addition amount (map having the number of rotations of the engine as a parameter) which has been prepared in advance through experiments and the like on the basis of the number of rotations of the engine at that time. The intervals of addition for preventing clogging T1 are calculated using the formula for calculation: [T1=(base value T0 for intervals of addition)×(water temperature correction coefficient)×α].

The base value T0 for the intervals of addition (basic addition intervals) is calculated in reference to a map for calculating the base value, where the number of rotations of the engine and the addition amount are parameters, on the basis of the number of rotations of the engine at that time. The map for calculating the base value is prepared in advance through experiments and the like and stored. The water temperature correction coefficient corrects the base value T0 of the addition intervals in accordance with the temperature of the water for cooling the engine 1. The water temperature correction coefficient is calculated in reference to a map that has been prepared in advance through experiments and the like on the basis of the temperature of the cooling water, which is read in from the output of a water temperature sensor 31. The water temperature correction coefficient becomes greater as the temperature of the cooling water rises, so as to become a value close to "1".

Each time the calculation of the addition amount for preventing clogging and intervals of addition for preventing clogging T1 is terminated as described above, opening and closing of the fuel adding valve 25 is controlled on the basis of the results of each calculation, and addition for preventing clogging is carried out (step ST6). The processes in these steps ST4 to ST6 are carried out repeatedly for each second that elapses after the point in time when the temperature at the distal end of the fuel adding valve 25 enters the distal end high temperature region A. These processes, that is to say, processes for correcting the intervals of addition for preventing clogging, are carried out, and thus, an appropriate fuel addition amount for the rise in the temperature of the fuel adding valve 25 is added in the transient state, where the temperature at the distal end of the fuel adding valve 25 enters the distal end high temperature region A.

Figure 5:
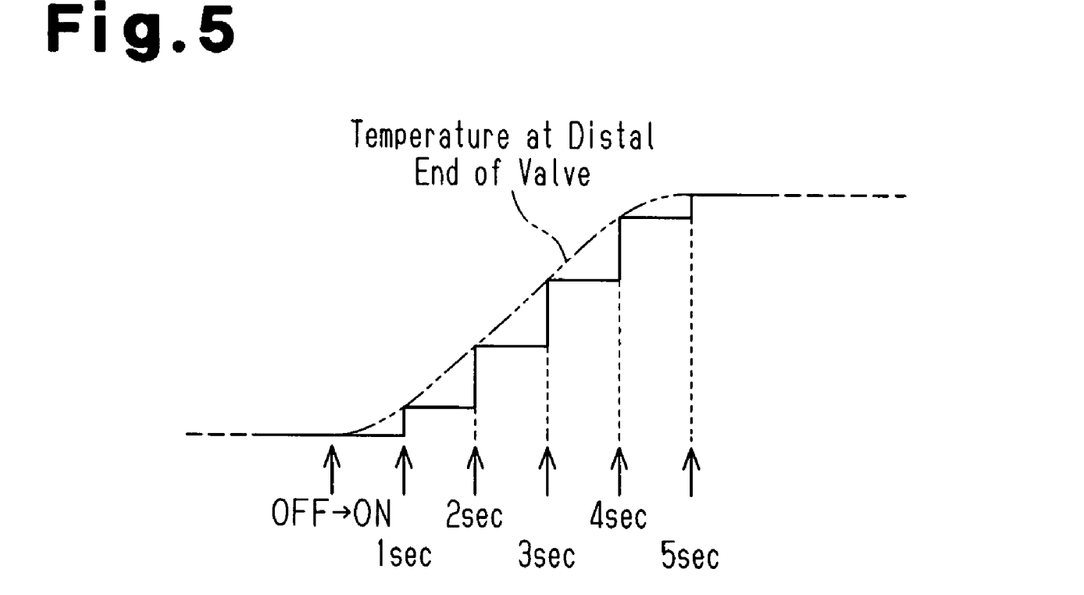
FIG. 5 is a diagram schematically showing fuel addition as carried out in the control of addition for preventing clogging shown in FIG. 3.
Figure 6:
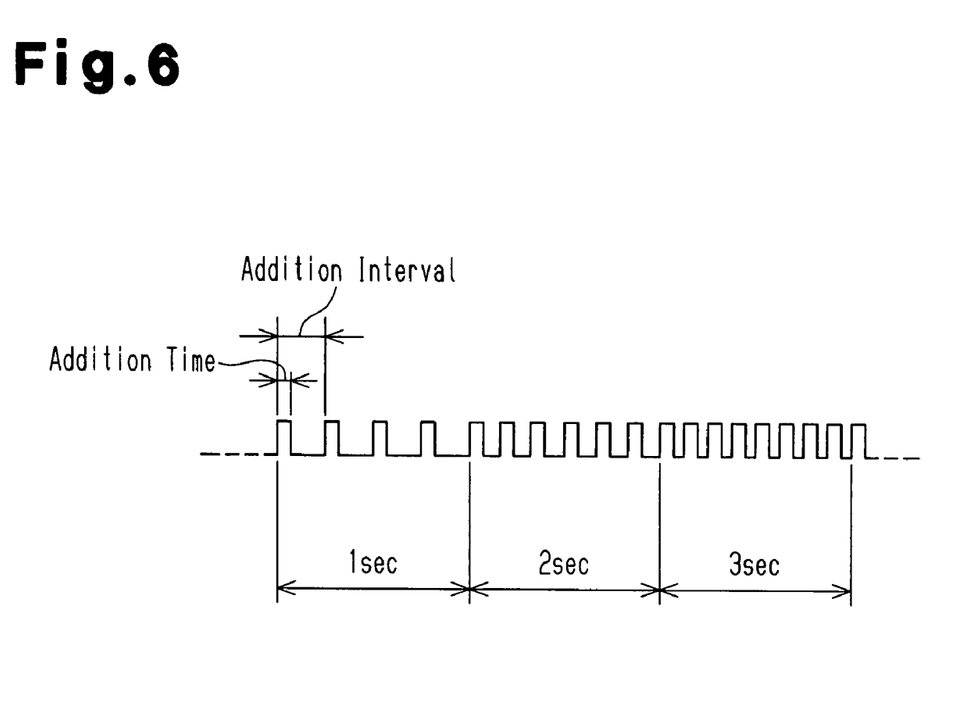
FIG. 6 is a time chart showing addition intervals for adding fuel, which is carried out in the control of addition for preventing clogging shown in FIG. 3.

This is described concretely in the following. As shown in FIGS. 5 and 6, in the case where the temperature at the distal end of the fuel adding valve 25 does not increase very much at the point in time when one second has elapsed after the temperature at the distal end of the fuel adding valve 25 enters the distal end high temperature region A, the addition interval correction coefficient α becomes a small value, and the intervals of addition for preventing clogging T1 are set long, making the amount of addition small. Next, the addition interval correction coefficient α becomes a greater value in sequence for every second that elapses, so that the amount of addition increases, and thus, it becomes possible to make the amount of addition follow the rise in the temperature at the distal end of the fuel adding valve 25, so that the wasteful addition amount as shown in FIG. 10 is reduced.

In addition, in this example, the addition interval correction coefficient α becomes α=1, irrespectively of the number of rotations of the engine (see map for calculating correction coefficient of FIG. 4) at the point in time when 5 seconds have elapsed after the point in time when the temperature at the distal end of the fuel adding valve 25 enters the distal end high temperature region A. Therefore, at the point in time when the elapsed time, which is counted by the timer 105, passes 6 seconds (the result of determination in step ST7 is affirmative), the timer 105 is cleared, and the routine for control of addition for preventing clogging is terminated (step ST8).

In the above described control of addition for preventing clogging, the intervals of addition for preventing clogging T1 are set (corrected) in accordance with the elapsed time after the point in time when the temperature at the distal end of the fuel adding valve 25 enters the distal end high temperature region A and the number of rotations of the engine, taking the delay in the rise in the temperature of the fuel adding valve 25 into consideration in the transient state, where the temperature at the distal end of the fuel adding valve 25 enters the distal end high temperature region A. Therefore, it becomes possible for an appropriate addition amount for the rise in the temperature of the fuel adding valve 25 to be added for preventing clogging in the transient state, where the temperature at the distal end of the fuel adding valve 25 enters the distal end high temperature region A, so that the wasteful fuel addition amount is reduced.

In the above illustrated embodiment, the addition interval correction coefficient α is set to α=1 when the elapsed time after the point in time when the temperature at the distal end of the fuel adding valve 25 enters the distal end high temperature region A is 5 seconds. However, the invention is not limited to this, and the addition interval correction coefficient α may be set to α=1 when the elapsed time is any other time, for example, 10 seconds.

In the above illustrated embodiment, the addition amount for preventing clogging and the addition intervals for preventing clogging T1 are calculated and addition for preventing clogging is carried out for each second that elapses after the temperature at the distal end of the fuel adding valve 25 enters the distal end high temperature region A. However, the invention is not limited to this, and the time of calculation and addition may be any time, and calculation and addition for preventing clogging may be carried out for every 0.5 seconds or every 2 seconds, for example.

In the above illustrated embodiment, the addition interval correction coefficient α is calculated on the basis of the elapsed time after the point in time when the temperature at the distal end of the fuel adding valve 25 enters the distal end high temperature region A and the number of rotations of the engine. Instead of this, the addition interval correction coefficient α may be calculated on the basis of the elapsed time after the point in time when the temperature at the distal end of the fuel adding valve 25 enters the distal end high temperature region A and the temperature of the exhaust (temperature of the exhaust upstream from a turbocharger 5). Alternatively, the addition interval correction coefficient α may be calculated on the basis of the elapsed time after the point in time when the temperature at the distal end of the fuel adding valve 25 enters the distal end high temperature region A and the intake air amount (amount of exhaust).

In the above illustrated embodiment, the addition intervals for preventing clogging T1 are calculated by multiplying the base value T0 for the addition intervals by the addition interval correction coefficient α. Instead of this, the addition period τ may be calculated by multiplying the base value τ0 for the addition period (basic addition period), which is calculated on the basis of, for example, the number of rotations of the engine (see FIG. 6), by a correction coefficient.

In the above illustrated embodiment, the temperature at the distal end of the fuel adding valve 25 is estimated from the drive state of the engine 1. Instead of this, an exhaust temperature sensor for detecting the temperature of the exhaust upstream from the turbocharger 5, for example, may be installed before the turbocharger, so that the temperature at the distal end of the fuel adding valve 25 may be estimated from the output of this sensor. Alternatively, a temperature sensor for directly detecting the temperature at the distal end of the fuel adding valve 25 may be installed, so that the temperature at the distal end may be gained from the output of this sensor.

Figure 7:
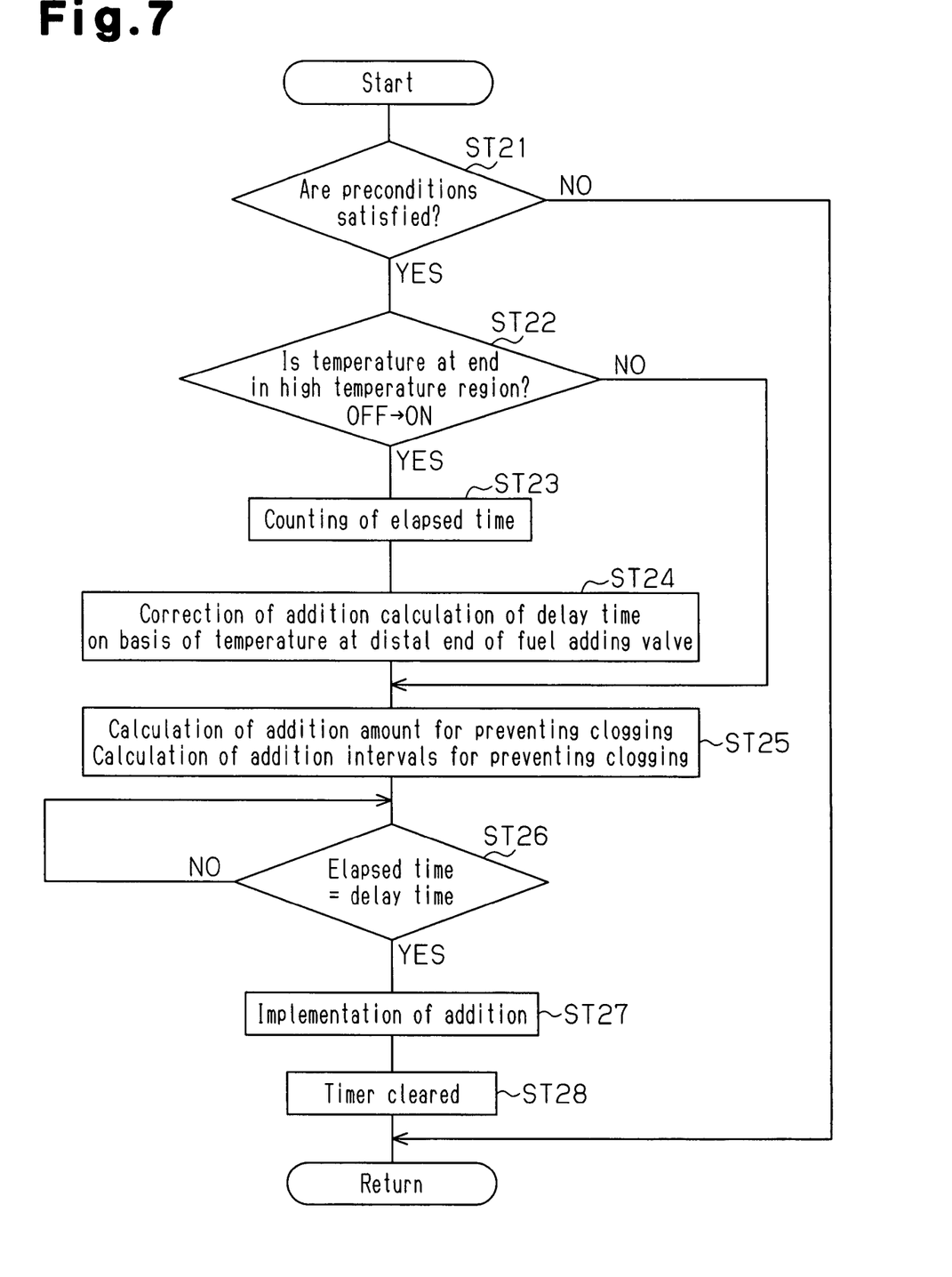
FIG. 7 is a flowchart showing another example of the control of addition for preventing clogging as carried out by the ECU.

Another embodiment of addition control for preventing which is carried out in the ECU 100 is described in reference to the flowchart shown in FIG. 7.

First, in step ST21, whether or not the preconditions for carrying out addition for preventing clogging are satisfied is determined, and in the case where the result of this determination is affirmative, the process goes to step ST22. In the case where the result of determination in step ST21 is negative, the routine for addition control for preventing clogging is terminated. The requisite conditions in step ST21 are, for example, the engine 1 has started without failure and reached a drive state of idling.

In step ST22, whether or not the temperature at the distal end of the fuel adding valve 25 enters the distal end high temperature region A (ON region) from the OFF region is determined in reference to a map for estimation shown in FIG. 9 on the basis of the number of rotations of the engine and the amount of fuel injected into the engine 1, which are read in from the output of the crank position sensor 40. In the case where the result of this determination is affirmative, that is to say, when the temperature at the distal end of the fuel adding valve 25 enters the distal end high temperature region A (OFF→ON), the process goes to step ST23. Then, the elapsed time after the point in time when the temperature at the distal end of the fuel adding valve 25 enters the distal end high temperature region A is counted by the timer 105. Meanwhile, in the case where the result of determination in step ST22 is negative, the process goes to step ST25.

Figure 8:
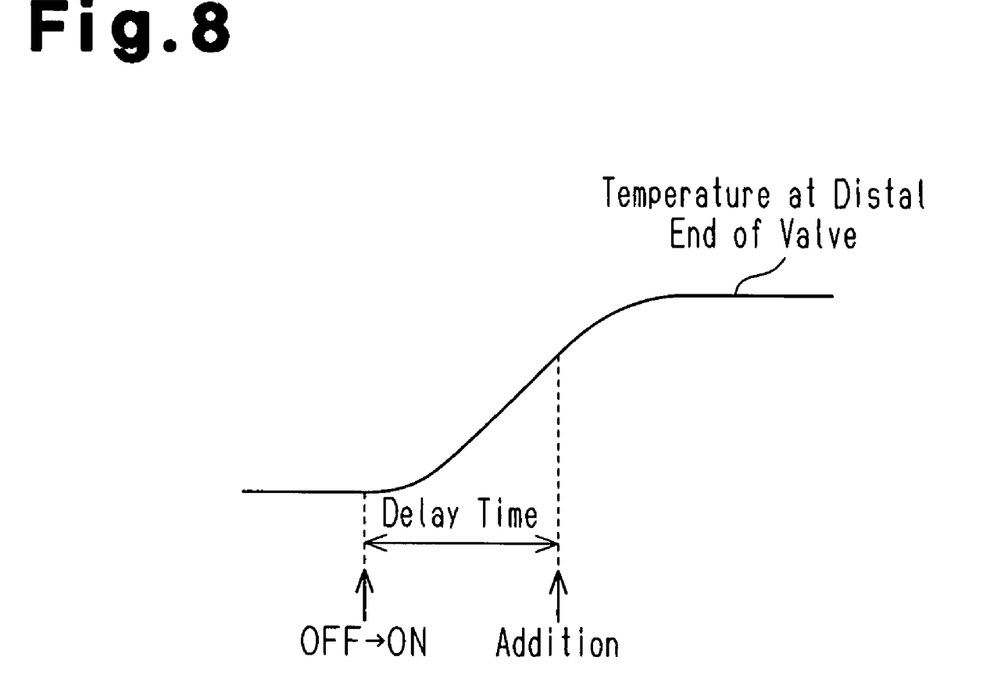
FIG. 8 is a diagram showing delay time by which the time when control of addition is started is delayed.

In step ST24, the delay time by which the time when addition control is started is delayed is found on the basis of the temperature at the distal end of the fuel adding valve 25 (see FIG. 8). Concretely, a map for the delay time for finding the delay time (for example, 3 seconds, 4 seconds, or 5 seconds) is prepared in advance. When this map is used, the temperature at the distal end of the fuel adding valve 25 is used as a parameter. The delay time corresponding to the temperature at the distal end of the fuel adding valve 25 is calculated in reference to this map for delay time.

An exhaust temperature sensor for detecting the temperature of the exhaust upstream from the turbocharger 5, for example, may be installed before the turbocharger, so that the temperature at the distal end of the fuel adding valve 25 may be estimated from the output of this sensor. Alternatively, a temperature sensor for directly detecting the temperature at the distal end of the fuel adding valve 25 may be installed, so that the temperature at the distal end of the fuel adding valve 25 may be gained from the output of this sensor. The temperature at the distal end of the fuel adding valve 25, which is used in the determination process in step ST22, may be gained from the output of these sensors.

In the map for delay time, the greater the difference in the temperature is when the OFF region changes to the ON region, for example, in the transient state, where the temperature at the distal end of the fuel adding valve 25 enters the distal end high temperature region A, the longer the delay time is set.

Next, in step ST25, the addition amount for preventing clogging and the addition intervals for preventing clogging T2 are calculated. The addition amount for preventing clogging is calculated in reference to a map for the addition amount having the number of rotations of the engine as a parameter on the basis of the number of rotations of the engine at that time. The addition intervals for preventing clogging T2 are calculated using an expression: [T2=(base value T0 for addition intervals)×(water temperature correction coefficient)]. Here, the base value T0 for the addition intervals is calculated in reference to a map for calculating the base value having the number of rotations of the engine and the addition amount as parameters on the basis of the number of rotations of the engine at that time. The water temperature correction coefficient corrects the base value T0 for the addition intervals in accordance with the temperature of water for cooling the engine 1. The water temperature correction coefficient is calculated in reference to a map on the basis of the temperature of cooling water, which is read in from the output of a water temperature sensor 31. The water temperature correction coefficient becomes greater as the temperature of the cooling water rises, so as to become a value close to "1".

Then, at the point in time when the elapsed time, which is counted by the timer 105, becomes the delay time, which is found in step ST24 (the result of determination in step ST26 is affirmative), opening and closing of the fuel adding valve 25 is controlled on the basis of the addition amount for preventing clogging and the addition intervals for preventing clogging T2, which are calculated in step ST25, and addition for preventing clogging is carried out (step ST27). After this, the timer 105 is cleared, and the routine for addition control for preventing clogging is terminated (step ST28).

According to the above described addition control for preventing clogging, addition control is started with a delay of a predetermined time from the point in time when the temperature at the distal end of the fuel adding valve 25 enters the distal end high temperature region A, taking into consideration that the temperature of the fuel adding valve 25 does not rise immediately in the transient state, where the temperature at the distal end of the fuel adding valve 25 enters the distal end high temperature region A. Therefore, the wasteful fuel addition amount is reduced. In addition, the delay time between the point in time when the temperature at the distal end of the fuel adding valve 25 enters the distal end high temperature region A and the time when addition control is started is set in accordance with the temperature of the fuel adding valve 25. Therefore, it becomes possible to add an appropriate fuel addition amount for the rise in the temperature of the fuel adding valve 25 in the transient state.

In the above illustrated embodiment, the delay time between the point in time when the temperature at the distal end of the fuel adding valve 25 enters the distal end high temperature region A and the time when addition control is started varies, depending on the temperature of the fuel adding valve 25. The invention is not limited to this, and the delay time may be a fixed value (for example, 5 seconds).

In the above illustrated embodiments, the exhaust purifying apparatus according to the present invention is applied to a four cylinder diesel engine with direct injection into the cylinders. However, the present invention is not limited to this, and can also be applied to other types of diesel engines with any number of cylinders, such as six cylinder diesel engines with direct injection into the cylinders. In addition, it is also possible to apply the present invention to types of diesel engines other than diesel engines with direct injection into the cylinders. It is possible to apply the present invention to engines used in applications other than automobiles.

Though in the above illustrated embodiments, the NOx storage reduction catalyst 4a and the DPNR catalyst 4b are provided as the catalyst device 4, a NOx storage reduction catalyst 4a and a DPF may be provided.

The invention claimed is:

1. A fuel addition apparatus for adding fuel into an exhaust passage of an internal combustion engine, the fuel addition apparatus comprising:
   a fuel adding valve for adding fuel into the exhaust passage of the internal combustion engine having a nozzle and nozzle hole exposed to the interior of the exhaust passage;
   a crank position sensor for determining whether the fuel adding valve itself has entered a high temperature region on the basis of number of rotations of the engine and the amount of fuel injected into the engine;
   an addition amount calculating section which calculates a fuel addition amount on the basis of the elapsed time after the point in time when the temperature of said fuel adding valve itself enters the high temperature region and based on the number of rotations of the engine; and
   an addition controlling section which controls addition of fuel on the basis of said calculated fuel addition amount and said elapsed time to prevent wasteful fuel addition,
   wherein clogging of the nozzle hole due to calking of substances such as soot and SOF deposited thereon, or adhered thereto, is limited or prevented.

2. The fuel addition apparatus according to claim 1, said addition amount calculating section calculates the fuel addition amount by multiplying the basic fuel addition amount, which is calculated from a map that has been set in advance, by a correction coefficient corresponding to said elapsed time and the operational state of said internal combustion engine.

3. The fuel addition apparatus according to claim 2, wherein said addition amount calculating section corrects the addition amount by multiplying one of a basic addition interval which is calculated from a map that has been set in advance and the basic addition period by said correction coefficient.

4. The fuel addition apparatus according to claim 1, wherein, as the operational state of said internal combustion engine, the temperature of the exhaust is used for the calculation of said fuel addition amount.

5. The fuel addition apparatus according to claim 1, wherein, as the drive state of said internal combustion engine, the intake air amount is used for the calculation of said fuel addition amount.

6. A fuel addition apparatus for adding fuel into an exhaust passage of an internal combustion engine, the fuel addition apparatus comprising:
   a fuel adding valve for adding fuel into the exhaust passage of the internal combustion engine having a nozzle and nozzle hole exposed to the interior of the exhaust passage;
   a crank position sensor for determining whether the fuel adding valve itself has entered a high temperature region on the basis of number of rotations of the engine and the amount of fuel injected into the engine;
   an addition controlling section which starts addition control after a predetermined period of time has elapsed from the point in time when the temperature of said fuel adding valve itself enters the high temperature region and based on the number of rotations of the engine; and
   a delay time, which is a period to when the addition control is started from the point in time when the temperature of said fuel adding valve enters a particular region that has been set in advance, is set in accordance with the temperature of said fuel adding valve to prevent wasteful fuel addition,
   wherein clogging of the nozzle hole due to calking of substances such as soot and SOF deposited thereon, or adhered thereto, is limited or prevented.

* * * * *